United States Patent [19]

Burckhardt et al.

[11] Patent Number: 4,826,257

[45] Date of Patent: May 2, 1989

[54] ANTI-BLOCKING SYSTEM FOR A ROAD VEHICLE HAVING A HYDRAULIC MULTI-CIRCUIT BRAKE INSTALLATION

[75] Inventors: Manfred Burckhardt, Waiblingen; Richard Zimmer, Fellback; Wolfgang Gautsch, Stuttgart, all of Fed. Rep. of Germany

[73] Assignee: Daimler-Benz Aktiengesellschaft, Stuttgart, Fed. Rep. of Germany

[21] Appl. No.: 161,107

[22] Filed: Feb. 26, 1988

[30] Foreign Application Priority Data

Feb. 28, 1987 [DE] Fed. Rep. of Germany ....... 3706663

[51] Int. Cl.$^4$ .............................................. B60T 8/62
[52] U.S. Cl. ...................................... 303/111; 303/96
[58] Field of Search ................. 303/92, 103, 106, 107, 303/108, 110, 111, 114, 116, 119; 364/426

[56] References Cited

U.S. PATENT DOCUMENTS

| | | | |
|---|---|---|---|
| 4,733,920 | 3/1988 | Pannbacker | 303/106 |
| 4,738,491 | 4/1988 | Sato | 303/106 |
| 4,753,493 | 6/1988 | Arikawa | 303/110 |
| 4,759,589 | 7/1988 | Leiber | 303/96 |

Primary Examiner—Duane A. Reger
Attorney, Agent, or Firm—Barnes & Thornburg

[57] ABSTRACT

An anti-blocking system for a road vehicle having a hydraulic service brake installation constructed as a dual-circuit brake installation with a front axle/rear axle brake circuit distribution which is adjustable to different values $m_1$ and $m_2$ of the front axle/rear axle braking force distribution, whereby the one value $m_1$ corresponds to a braking force distribution optimized in the sense of driving stability and the other value corresponds to a relatively higher value of the rear axle braking force proportion. As long as the regulation is effective only at the rear axle, this anti-blocking system operates according to the principle of keeping a braking slippage $\lambda_H$ occurring in the rear axle brake circuit within the range of values delimited by the relation $\lambda_V + \Delta\lambda \leq \lambda_H \leq \lambda_V + \Delta\lambda$ in relation to a braking slippage $\lambda_V$ occurring in the front axle brake circuit, whereby $\Delta\lambda$ designates a permissive slippage differential of about 4% and $\Delta\lambda' \approx \Delta\lambda/2$. As soon as the anti-blocking regulation is also effective on the front axle, both the latter and the rear axle are regulated according to the principle of keeping both the front axle braking slippage $\lambda_V$ and the rear axle braking slippage $\lambda_H$ within the same range of values delimited by an upper limit of the braking slippage which is compatible with good braking deceleration and equally good driving stability.

14 Claims, 4 Drawing Sheets

ANTI-BLOCKING SYSTEM FOR A ROAD VEHICLE HAVING A HYDRAULIC MULTI-CIRCUIT BRAKE INSTALLATION

BACKGROUND AND SUMMARY OF THE INVENTION

The invention relates to an anti-blocking system for a road vehicle having a hydraulic multi-circuit brake installation which can be changed over by means of an electrohydraulic shifting device from a functional state which corresponds, in the sense of a fixed determination of the front axle/rear axle braking force distribution $B_{VA}/B_{HA}$ to a dimensioning for stable driving behavior up to the highest possible values of the braking Z of the vehicle, into a functional state which corresponds, likewise in the sense of a fixed determination of the ratio $B_{VA}/B_{VH}$, to a dimensioning of this ratio to a higher value of the rear axle braking force proportion.

Such an anti-blocking system is known from DE No. 34 36 223 A1 for a road vehicle which has a diagonal brake circuit division so that the two wheel brakes of the respectively mutually diagonally oppositely arranged front wheels and rear wheels are combined to form one brake circuit each. One of the two brake circuits is dynamic and is actuated by the output pressure, proportional to the force with which the driver actuates a braking device of a hydralic brake force servo unit. The other brake circuit is static and connected to an output pressure chamber of the braking device which is movably delimited by a piston acted upon one one side by the output pressure of the brake force servo unit, which produces a 1/1 transmission of the output pressure of the brake force servo unit into the static output pressure chamber of the braking device. A common outlet valve adapted to be electrically modulated, in the open position of which brake fluid can be discharged out of the rear wheel brakes to the—pressureless—tank of the auxililary pressure source, is provided for the rear wheel brakes of the vehicle in order to regulate the braking pressure in the sense of the anti-blocking regulation operation. This may be constructed as an electrically driven pump, by the intermitent—pulsed—change-over of which into the circulating operation the output pressure of the brake force servo unit can be reduced, which leads to a braking pressure reduction both in the dynamic and in the static brake circuit. An anti-blocking regulation operating according to the Select Low Principle is achieved both on the front wheel brakes and on the rear wheel brakes as a result thereof. A braking force distribution control valve constructed as a 2/2 way solenoid valve, which is provided for each of the two brake circuits, can be changed over between alternative through-flow and shut-off positions. In the through-flow positions of these valves, the rear wheel brakes are connected to the pressure output, associated with the respective brake circuit, of the braking device and are thereby also connected to the front wheel brake of this brake circuit, whereas in the shut-off positions of these valves they are shut off from the respective pressure output and the respective front wheel brake(s). By a pulsating changeover of these brake force distribution control valves with an appropriate ratio of pulse durations in which they are activated into their flow positions and their shut-off positions, different values of the front axle/rear axle brake force distribution can be obtained, while a permanent maintenance of the through-flow positions of the brake force distribution control valves corresponds to the highest possible rear axle brake force proportion, and in the case of permanent maintenance of the shut-off positions of these two valves, the braking force is built up only through the front wheel brakes.

In the brake installation according to DE No. 34 36 223 A1, the pulse duty ratio with which the braking force distribution control valves are changed over into their alternative functional positions is controlled as a function of the values of the braking slippages which occur at the front wheels and at the rear wheels, which are detected in a customary manner by processing output signals from electronic wheel velocity sensors individually associated with the vehicle wheels, so that, as further known from DE No. 33 01 948 A1, to which reference is made in this respect in the DE No. 34 36 223 A1, approximately the same utilization of friction is obtained at the—braked—front wheels and rear wheels of the vehicle, with the provison that this friction utilization, that is to say, the braking slippage, should be only relatively slightly lower at the rear wheels (by 3% to 15%, for example) than at the front wheels. This mode of braking force distribution control produces relatively good approximation to the "ideal" control in the entire range of possible vehicle decelerations, braking force distribution characterized by equality of the friction utilizlation at the front wheels and at the rear wheels, and also takes into consideration the desideratum of high driving stability within the widest possible range.

Nevertheless, such a braking force distribution, generally considered optimum and therefore also aimed at as a general rule, possesses the disadvantage, which must be regarded as very serious, that in every braking situation; that is, both in the case of a full braking where the vehicle wheels are decelerated almost to the locking limit, and also in the case of a partial braking where the vehicle wheels remain "a long way away" from the locking limit, the front wheel brakes have to perform the predominant part of the deceleration work, with the result that both the thermal and the mechanical loading of the front wheel brakes and the front wheels overall is substantially higher than that of the rear wheels. However,it is not only unfavorable here that the front wheel brakes are subjected to greater wear, which can be "compensated" by appropriately careful maintenance, but also that in driving situations, such as a prolonged pass descent in mountains, for example, in which the service brake has to be repeatedly actuated vigorously and for a relatively high proportion of the driving duration, overheating of the front wheel brakes occurs; however, with the consequence that, in the case of a vehicle having front axle/rear axle brake circuit distribution, the front axle brake circuit at first and then with high probability, the rear axle brake circuit will also fail, and in the case of a vehicle having diagonal brake circuit distribution, it will even be highly probable that both brake circuits will fail simultaneously, notwithstanding the fact that the brake installation has only been loaded in the partial braking range.

It is clear that such safety risks, which may arise in statistically significant braking situations, are unacceptable.

However, since it is to be assumed that these risks may be estimated to be lower in the case of a vehicle having front axle/rear brake circuit distribution, by virtue of the system as it were, it is therefore the object of the invention to improve an anti-blocking system of the aforementioned type for such a brake installation so that the utilization of an increased rear axle braking force proportion is possible with undiminished good driving stability.

The object is achieved according to the invention by the features to be described more fully hereinafter.

Accordingly, as long as no tendency to lock exists at the front axle, the anti-blocking regulation operates in the rear axle brake circuit according to the principle of regulating any braking slippage occuring there in relation to the braking slippage occurring at the front axle in such a manner that the rear axle braking slippage does not exceed by more than 6% a braking slippage occuring at the front axle, which may be considered adequate for a stable braking behavior of the vehicle. However, the admissible slippage differential will preferably be kept somewhat smaller, that is to say, at a value of approximately 4%, in order to ensure adequate driving stability in every case. This mode of rear axle braking slippage regulation is abandoned in favor of the "normal" anti-blocking regulation when and as long as the regulation is also effective at the front axle, while in this case the relative braking slippage both at the front axle and at the rear axle, referred in this case to a reference velocity characteristic of the vehicle speed adapted to be determined by known criteria, is kept within a range of values restricted by a slippage threshold which ensures adequate driving stability.

The regulation algorithm according to this invention ensures high sensitivity of the regulation and leads to good utilization of the braking forces which can be exerted by way of the rear axle.

According to other features of this invention, alternative constructions of the electrohydraulic shifting device may be used, by means of which the brake installation is controllable at the commencement of braking into that functional state which corresponds to the braking force distribution with the higher rear axle braking force proportion. A pressure reducer provided for this purpose according to this invention may be readily integrated into a braking device of the brake installation constructed as a tandem master cylinder.

According to still further features of this invention, measures may be adopted alternatively as also optionally in combination, for obtaining a reference velocity by means of which the rear wheel braking slippage is determined and regulated when and so long as the regulation is only effective on the rear axle. In this context, particularly good sensitivity of the regulation, which promotes the stability of the braking behavior of the vehicle, is obtained by the particular reference signal gathering provided according to this invention.

Good sensitivity may also be achieved by utilizing as reference velocity the wheel circumference velocity of the respective fastest-rotating front wheel.

In the case of a construction of the brake installation as disclosed herein, it is possible for the installed braking force distribution to be changed over by utilizing differently large effective piston surfaces of the wheel brake cylinders, by "disconnecting" or "connecting" a T-partial circuit of the rear axle brake circuit, for example.

According to still further features of the present invention, a particularly good sensitivity of reaction on the part of the anti-locking regulation may be achieved as long as the latter is effective only on the rear axle, and ensure thereby that the maximum transmissible braking forces can be utilized as soon as the regulation takes effect on the front axle.

BRIEF DESCRIPTION OF THE DRAWINGS

These and other objects, features and advantages of the present invention will become more apparent from the following description when taken in connection with the accompanying drawing which shows, for purposes of illustration only, several embodiments in accordance with the present invention, and wherein.

DETAILED DESCRIPTION OF THE DRAWINGS

Figure 1:
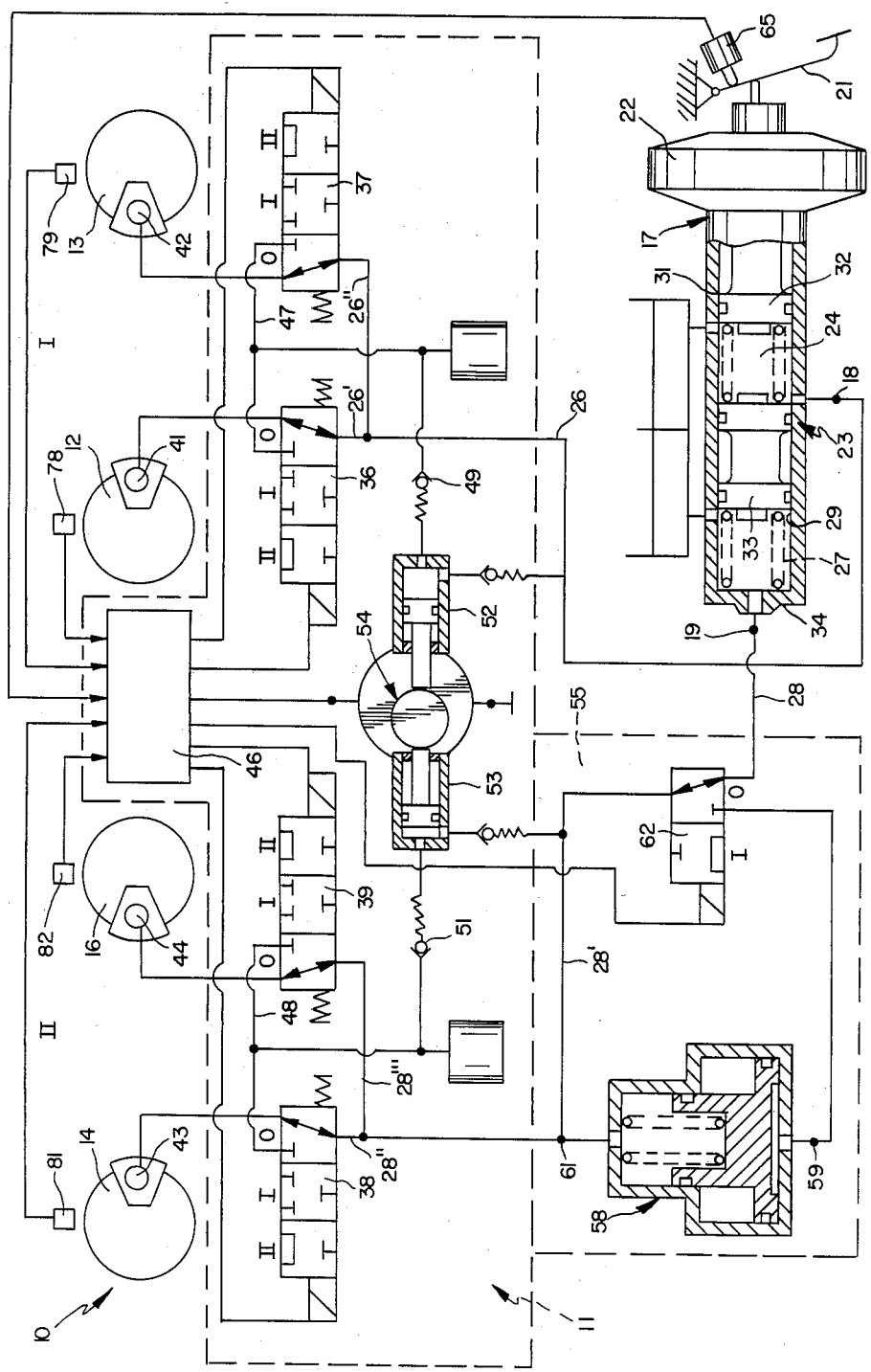
FIG. 1 is an electrohydraulic block diagram of a hydraulic brake installation equipped with an anti-blocking system according to the invention.

Referring now to the drawing wherein like reference numerals are used throughout the various views to designate like parts, and more particularly to FIG. 1, reference numeral 10 generally designates in this figure the hydraulic brake installation of a road vehicle not shown but represented by the brake installation, which is equipped with an anti-blocking system (ABS) according to the invention, generally designated by reference numeral 11. The brake installation 10 is constructed as dual-circuit brake installation in conformity with legal requirements. The wheel brakes 12 and 13 of the left-hand and of the right-hand front wheel of the vehicle are combined to form a front axle brake circuit II, and the wheel brakes 14 and 16 of the left-hand rear wheel and of the right-hand rear wheel to form a rear axle brake circuit II.

These brake circuits I and II are constructed as statically pressure-actuated brake circuits, whereby a braking device 17 is provided for the supply of braking pressure of these brake circuits I and II, which has a braking pressure outlet 18 associated with the front axle brake circuit I and a braking pressure outlet 19 associated with the rear axle brake circuit II. In the specific exemplary embodiment illustrated, the braking device 17 is constructed as a tandem master cylinder 23, of a type known pe se, actuatable by means of a brake pedal 21 by way of a brake force servo device 22, which has a primary output pressure chamber 24, to which the main brake line 26 of the front axle brake circuit I is connected, and a secondary output pressure chamber 27, to the braking pressure output 19 of which the main brake line 28 of the rear axle brake circuit II is connected. Within the bore 29 of the master cylinder housing 31, the primary output pressure chamber 24 is movably delimited, on the one hand, by the primary piston 32, which is acted upon by the amplified pedal actuation force, and, on the other hand, by the secondary piston constructed as a floating piston 33, which also forms the movable limitation on one side of the secondary ouput pressure chamber 27, which is delimited integrally with the housing by the end face wall 34 of the tandem master cylinder 23. In the specific exemplary embodiment illustrated, the anti-blocking system 11 is constructed as a so-called four-channel ABS, which permits an individual regulation of the braking pressures at the individual wheel brakes 12, 13, 14 and 16. For this purpose, braking pressure regulator valves 36, 37, 38 and 39 are provided associated individually with each of the wheel brakes 12 and 13 of the front axle brake circuit I and the wheel brakes 14 and 16 of the rear axle brake circuit II. These braking pressure regulator valves are constructed as 3/3-way-solenoid valves which are included each in one of the brake line branches 26' or 26" and 28" or 28'" of the front axle brake circuit I and of the rear axle brake circuit II, respectively, which lead from the main brake lines 26 and 28, respectively, to the individual wheel brake cylinders or brake calipers 41 and 42 or 43 and 44.

The illustrated basic position O of these braking pressure regulator valves 36, 37, 38 and 39, which they assume both in the case of a normal braking, that is to say, not subject to the regulation, and also in pressure build-up phases of the anti-blocking regulation, is a through-flow position in which the brake calipers 41 and 42 of the front axle brake circuit I are connected to the pressure output 18 of the braking device 17, and the brake calipers 43 and 44 of the rear axle brake circuit II to the pressure output 19 of the braking device 17. By output signals of defined control current intensity, 3A output signals, for example, of an electronic control unit 46 of the ABS 11, the braking pressure regulator valves 36, 37, 38 and/or 39 are controllable individually or severally, according to which vehicle wheel the regulation is effective on, into their energized position I, the shut-off position or pressure-holding position, in which the wheel brake calipers 41 and/or 42 and 43 and/or 44 of the front axle brake circuit I and/or of the rear axle brake circuit II are shut off from the respective braking pressure output 18 or 19 of the braking device 17. By output signals of a defined higher control current intensity, 6A output signals, for example, from the electronic control unit 46, the braking pressure regulator valves 36 and/or 37 and 38 and/or 39 are controllable in the sense of the anti-blocking regulation nto their energized position II—the pressure reduction postion—in which the wheel brake calipers 41 and/or 41 of the left-hand or the right-hand front wheel brake 12 or 13 are connected to a return line 47 of the front axle brake circuit I, or the wheel brake calipers 43 of the left-hand rear wheel brake 14 and/or the wheel brake calipers 44 of the right-hand rear wheel brake 16 are connected to a return line 48 of the rear axle brake circuit II.

The return lines 47 and 48 are each connected through a check-valve 49 or 51 to a return delivery pump 52 or 53 associated with the front axle brake circuit I or with the rear axle brake circuit II, respectively, by means of which brake fluid discharged from one or more of the wheel brakes 12 and/or 13 or 14 and/or 16 is pumped back—on the return delivery principle—into the respectively associated master cylinder output pressure chamber 24 or 28, respectively, during a pressure reduction phase of the anti-blocking regulation. The two return delivery pumps 52 and 53 are constructed as piston pumps having a common eccentric drive 54 with an electric drive motor, the activation of which is likewise controlled by output signals of the electronic control unit 46.

The modulating signals for the braking pressure regulator valves 36 and 39 and for the return delivery pumps 52 and 53 which are necessary for a correct regulation control of pressure reduction-, pressure holding- and renewed pressure build-up-phases of the anti-blocking regulation are generated by the electronic control unit 46 frm a comparative and differentiating processing of the output signals from the wheel velocity sensors 56 and 57, 58 and 59 individually associated with the vehicle wheels, which are provided to monitor the movement behavior of the vehicle wheels and emit electrical output signals characteristic of—and proportional to—their wheel circumferential velocities.

The ABS 11 so far explained, which may be assumed to be known as to construction and function, operates in a customary manner, for the explanation of which, as an example, a regulation cycle in the case of a response of the regulation at the left-hand front wheel of the vehicle will be seleclted as follows, whereby the regulation algorithm will not be explained in all details, but only insofar as is necessary for the understanding of the structural and functional particulars of the ABS 11 essential to the invention to be explained hereinafter: a pressure-reduction phase initiating a regulation cycle of the anti-blocking regulation is inititated each time when, during a braking (a) the wheel deceleration ($-a$) exceeds quantitatively a predetermined threshold lvalue of 1.4 g, for example, and/or (b) when the relatie braking slippage $\lambda = 100 \cdot (v_F - v_R)/v_F [\%]$ referred to a reference velocity $v_F$ representing the vehicle speed exceeds a threshold value $\lambda_2$, the typical value of which is 20%, where $v_R$ connotes the wheel circumferential velocity.

The threshold value 2 is in practice greater by approximately 4% than the value $\lambda n_{Fmax}$ of the braking slippage associated with maximum utilization of friction (frictional engagement utilization).

If the regulation has responded because the a-threshold value was exceeded, but not the slippage threshold value $\lambda_2$, and if—after the response of the regulation—the smaller threshold value $\lambda_1$ of the braking slippage of, for example, 8%, is not exceeded, then after the initial pressure-reduction phase which lasts approximately 20 ms, the pressure is held for a period of approximately 60 to 70 ms and then further reduced. If the lower braking slippage threshold value $\lambda_1$ is not exceeded in spite of the pressure reduction triggered due to a $\geq a_s (= 1.4$ g), then the pressure-reduction phase is continued until the signal characteristic of a $\geq a_s$ produced by the electronic control unit 46 for the internal processing decreases.

If the regulation responds because $\lambda > \lambda_2$ and/or in the course of a regulation cycle leads to the condition that a $< a_s$, but $\lambda$ is greater than $\lambda_2$, then after a pressure reduction phase a pressure holding phase is initiated as soon as the signal characteristic for $\lambda > \lambda_2$ decreases. Such a pressure-holding phase is maintained for a specific period of approximately 70 ms and the pressure is then increased again by a brief activation of the braking pressure regulator valve 36 into its pressure build-up position O for a maximum 30 ms, whereupon a pressure-holding phase of the aforementioned duration follows again etc., unless the respective signal characteristic of a $\geq a_s$ and/or $\lambda \geq \lambda_1$ or $\lambda_2$ appears again.

The braking pressure is also maintained if the vehicle wheel subject to the regulation is accelerated again and a first threshold value $b_1$ of, for example, 2 g is exceeded thereby, and the braking pressure is built up again when the accelerlation of the vehicle wheel—braked by regulation—again exceeds a threshold value $b_2$, for example, of 4 g. The build-up of braking pressure then occurs pulsed, that is, in alternate pressure build-up and pressure-holding phases, the duration of which is approximately 70 ms of each case.

The reference velocity $v_F$ representing the vehicle speed, with reference to which the braking slippage of the respective vehicle wheel is determined, is "formed" internally by the electronic control unit 46, in principle by a reduction of an initial value of the vehicle speed corresponding to the course of a normal braking, for which, for example, the higher of the two front wheel velocities which existed immediately before the actuation of the brake installation 10 is chosen.

In the case of a conventional ABS, this operates both on the front axle and also on the rear axle in the manner explained above.

In order to explain an electrohydraulic change-over or shifting device provided within the context of the brake installation 10 and generally designated by reference numeral 55, reference will now also be made to the particulars of FIG. 2, by means of which the functional particulars of the ABS 11 according to the invention are also explained hereinafter.

The purpose of this electrohydraulic shifting device 55 is to be able to adjust the installed brake force distribution, that is to say, the ratio $B_{VA}/B_{HA}$ of the brake forces $B_{VA}$ and $B_{HA}$ adapted to be transmitted by way of the front wheel brakes 12 and 13, on the one hand, and by way of the rear wheel brakes 14 and 16 on the other hand, which is made in the sense of a fixed determnation, to two different values $m_1$ and $m_2$.

Figure 2:
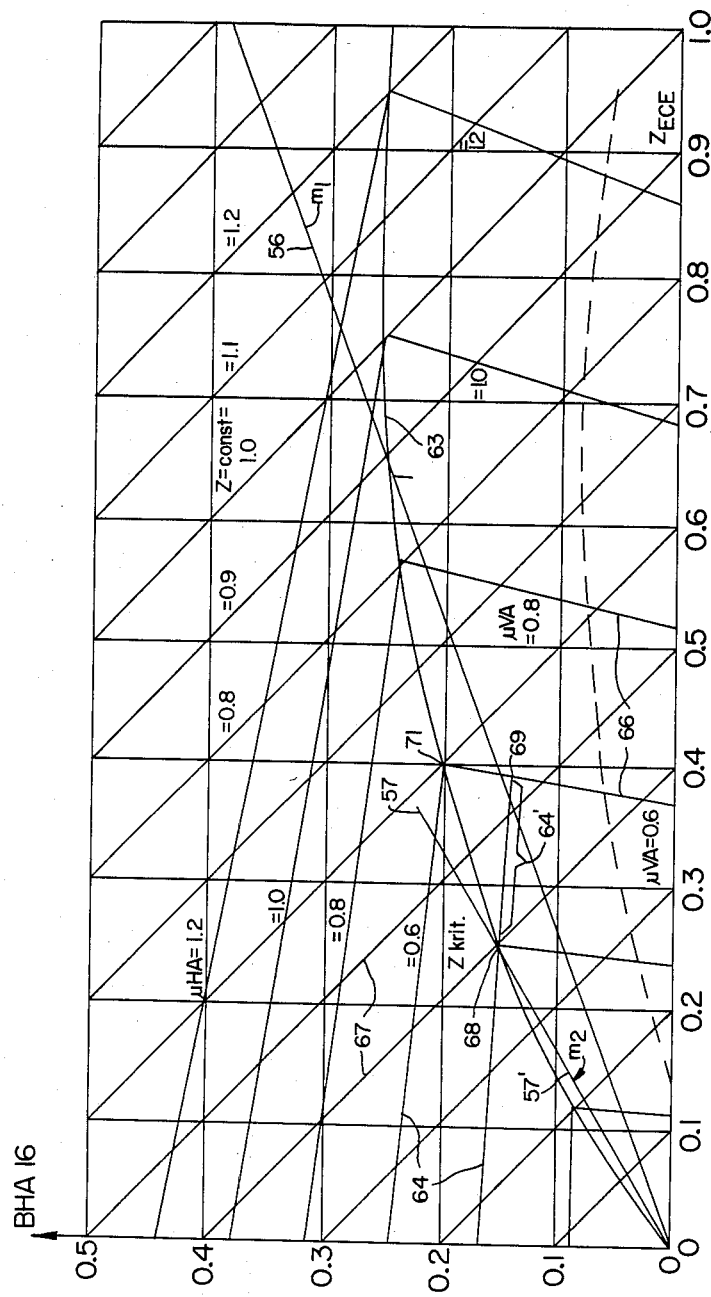
FIG. 2 is a brake force distribution graph to explain the function of the brake installation and of the ABS according to FIGS. 1 and 3.

These ratios $m_1$ and $m_2$ correspond in the graph of FIG. 2, in which the front axle braking force $B_{VA}/G$ referred to the vehicle weight G is plotted along the abscissa and the rear axle braking force $B_{HA}/G$, also referred to the vehicle weight G, along the ordinate, to the slopes of the two straight lines 56 and 57, one of which—the straight line 56—represents a permanently determined installed braking force distribution, which applies even for the highest possible value of the braking Z referred to the vehicle weight, for which a value of about 1 can be assumed, but which may also be up to 25% higher in the case of modern high $\mu$-tires, and the other of which—the straight line 57—represents a permanently determined installed braking force disribution which is characerized by a higher rear axle braking force proportion $B_{HA}$, but leads to unstable movement behavior of the vehicle already at a value of approximately 0.4 of the braking Z, because from this value, towards higher values of the braking Z, the rear axle is "overbraked" and the rear wheels of the vehicle therefore tend to lock sooner than the front wheels.

It has been assumed for the embodiment illustrated in FIG. 1 that the dimensioning of the installed braking force distribution dictated by the dimensioning of the front wheel brakes 12 and 13 and of the rear wheel brakes 14 and 16 and also of the braking device 17, considered so far by itself, corresponds to the straight lilne 56 which has the smaller slope ($m_1$) of 0.43. The changeover or shifting device 55 is so constructetd that, in its non-activated condition, the brake installation 10 operates with the value $m_1$ of the installed braking force distribution which ensures the highest possible driving and braking stability and that, when the changeover or shifting device 55 is activated, the brake installation 10 operates with the installed braking force distribution corresponding to the other straight line 57 in FIG. 2, for which the rear axle braking force fraction $B_{HA}$ is higher by a factor of 2 than the braking force distribution designed for optimum braking stability.

In the specific exemplary embodiment illustrated, the changeover or shifting device 55 comprises a pressure intensifier or pressure increase converter generally designated 58, which, when its pressure input 59 is acted upon by a pressure P, delivers the output pressure 2 P at its pressure output 61.

The changeover or shifting device 55 further comprises a changeover or shifting valve 62 which is connected between the pressure input 59 of the pressure intensifier 58 and the pressure output 19 of the braking device 17 associated with the rear axle brake circuit II.

If the specific embodiment illustrated, this changeover valve 62 is constructed as a 3/2-way solenoid valve which is controllablel by an output signal of the electronic control unit 46 of the ABS 11 from its illustrated basic position O into its energized position I; the basic position O of this changeover valve 62 is a through-flow position in which the pressure output 19 of the braking device 17 associated with the rear axle brake circuit II is connected to that section 28' of the main brake line 28 of the rear axle brake circuit II arranged "on the other side" of the changeover valve 62 and leading to the brake line branches 28" and 28''' of the rear axle braking circuit, but is shut off from the pressure input 59 of the pressure intensifier 58 of the changeover device 55, while the energized position I of the changeover valve 62 is a through-flow position alternative to its basic position O, in which the pressure output 19 of the braking device 17 associated with the rear axle braking circuit II is connected to the pressure input 59 of the pressure intensifier 58, but is shut off from the continuing section 28' of the main brake line of the rear axle brake circuit II.

In this functional position I of the changeover valve 62, compared to the function of the brake installation 10 in the basic position O of this valve 62, a braking pressure increased by the factor 2 is thus applied to the wheel brakes 14 and 16 of the rear axle brake circuit II.

The brake installation 10 and the ABS 11 are explained below by reference to their functional characteristics, with a knowledge of which an expert can immediately adopt the structural and electronic circuitry measures necessary for obtaining these characteristics.

Assuming correct functioning of the brake installation 10 and of the ABS 11, the changeover valve 62 is activated by the actuation of the brake installation 10—for example, triggered by the reaction of the brake light switch 65, or in that the electronic control unit 46 "recognizes" a deceleration of the vehicle wheels—by an output signal of the electronic control unit 46 into the energized position I in which the pressure intensifier 58 is increased by the intensification factor—in the specific embodiment, the factor 2—in the sense of an increase in the braking pressure applied to the rear wheel brakes 14 and 16 compared to the output pressure of the braking device 17.

Upon the actuation of the service brake installation 10 of the vehicle, the installation is thus adjusted—in the normal case—to the installed braking force distribution associated with the relatively high rear axle braking force proportion according to the straight line 57 in FIG. 2 with the greater slope $m_2$, for which the critical value $Z_{crit}$ of the braking Z, above which the rear axle is "overbraked" and the rear wheels therefore tend to lock sooner than the front wheels, is approximately 0.4.

The consequence of this is that even for relatively high coefficients of friction between the road and the braked vehicle wheels, assuming equal values thereof at all the vehicle wheels, the regulation commences on the rear axle as soon as the braking Z exceeds the value 0.4, whereas the front axle is still "far away" from a tendency to lock.

In case the anti-blockiing regulation means is effective solely on the rear axle, the regulation operates so that the braking slippage $\lambda_{HL}$ and $\lambda_{HR}$ of the left-hand rear wheel and of the right-hand rear wheel, compared to the braking slippage $\lambda_{VL}$ and/or $\lambda_{VR}$ of the left-hand front wheel and/or of the right-hand front wheel exceeds by a maximum amount $\Delta\lambda$ of 6% the braking slippage of the front wheel used for the comparison, which is synonymous with saying that the wheel circumferential velocity $v_{HL}$ and/or $v_{HR}$ must not differ from the front wheel velocity used for the comparison by more than the percentage stated by the quantity $\Delta$—towards lower values—in order that a stable movement behavior of the vehicle is still ensured while braking.

However, the regulation conveniently reacts already on the rear axle at a lower value of the velocity differential or slippage differential than 6%, which should be regarded as an upper limit for a slippage differential between the rear axle and the front axle just barely still compatible with a stable movement behavior of the vehicle, in a typical dimensioning at a value of around 4%.

The ABS 11 is further so designed that the regulation, when it has become effective only on the rear axle, is "switched off" again when the braking slippage $\lambda_H$ of the rear wheels subject to the regulation exceeds the value $\lambda_V$ of the braking slippage occurring at the front axle which is critical for the comparison, by less than the amount $\Delta\lambda'$ which is 2% for a typical design.

As long as the regulation is effective—solely on the rear axle—the braking slippage $\lambda_H$ occurring thereat is therefore held within the range of values $$\lambda_V + \Delta\lambda' \leq \lambda_H \leq \lambda_V + \Delta\lambda \quad (1)$$

Braking pressure reduction phases, braking pressure maintaining phases and braking pressure build-up phases necessary for this purpose can then be controlled in the same manner—by means of the braking pressure regulator valves 38 and 39 of the rear axle brake circuit II—as explained above by the example of a regulation cycle on the front axle, to which reference is made in order to avoid repetition. The only differences therefrom are the criteria according to which the sole regulation at the rear axle commences and is switched off again.

The following are specific possible relevant criteria and therewith also designs of the electronic control unit 46 of the ABS 11, which produce a regulation in the sense of the generally valid relation (1):

1. The regulation becomes effective at the left-hand and/or at the right-hand rear wheel when its wheel circumferential velocity $v_{HL}$ or $v_{HR}$ is more than 4% lower than that—$v_{VL}$ or $v_{VR}$—of the front wheel on the same side of the vehicle, that is to say when:

$$v_{HL} \cdot .014 \leq v_{VL} \text{ and/or}$$

$$v_{HR} \cdot 1.04 \leq v_{VR} \quad (2),$$

and is switched off again when:

$$v_{HL} \cdot 1.02 \geq v_{VL} \text{ and/or}$$

$$v_{HR} \cdot 1.02 \geq v_{VR} \quad (3).$$

The high probability that the wheels on one side of the vehicle roll off on road areas of equal coefficient of friction is weighted more strongly by this type of regulation control, 2. The regulation is activated on that rear wheel, the braking slippage of which is more than 4% greater than that of the diagonally opposite front wheel, that is to say when:

$$v_{HL} \cdot 1.04 \leq v_{VR} \text{ and/or}$$

$$v_{HR} \cdot 1.04 \leq v_{VL} \quad (2')$$

and is switched off again when:

$$v_{HL} \cdot 1.02 \geq v_{VR} \text{ and/or}$$

$$v_{HR} \cdot 1.02 \geq v_{VL} \quad (3')$$

This form of regulation produces quasi a lowering of the response threshold when negotiating curves—due to the different rolling radii of the vehicle wheels—because according to the road configuration and to the geometry of the vehicle the lower of the rear wheel velocities is compared with the higher of the front wheel velocities in each case.

This type of regulation is therefore particularly favorable for the sake of good driving stability.

3. The regulation is activated on that rear wheel of the vehicle, the braking slippage of which exceeds by more than the response threshold $\Delta\lambda$ (4%) that of the faster rotating front wheel, that is to say when:

$$(v_{HL}, v_{HR}) \cdot 1.04 \leq v_{Vmax} \quad (2''),$$

where $v_{Vmas}$ connotes the higher of the two front wheel velocities, and is switched off when:

$$(v_{HL}, v_{HR}) \cdot 1.02 \geq v_{Vmax} \quad (3'').$$

This type of regulation is adjusted for optimum driving stability in each driving situation.

4. The regulation is activated when:

$$(v_{HL} + v_{HR}) \cdot 1.04 \leq (v_{VL} + v_{VR}) \quad (2''')$$

and is switched off again when:

$$(v_{HL} + v_{HR}) \cdot 1.02 \geq (v_{VL} + v_{VR}) \quad (3''')$$

This type of regulation control is utilized, for example, when the vehicle is equipped with a three-channel ABS which operates with an individual wheel regulation on the front axle and a common regulation of the rear wheels according to the Select Low Principle.

Obviously, the regulation criteria stated under 1. to 4. are not necessarily mutually exclusive, but may be adopted on one and the same vehicle, for example, for different ranges of the driving speed and/or of the braking deceleration.

Reference will now be made once more t the braking force distribution graph of FIG. 2 for an—again exemplary—explanation of a regulation cycle of the ABS 11 when the latter initially becomes effective only on the rear axle. This graph shows in the customary manner the typical curve of a parabola 63 of the ideal braking force distribution characteristic for a passenger motor vehicle, the straight lines 64 of the constant coefficient of friction $\mu_{HA}$ and constant friction utilization at the rear axle, the straight lines 66 of constant coefficient of friction $\mu_{VA}$ and constant friction utilization at the front axle, the straight lines 67 of constant vehicle decelerations Z referred ot the vehicle weight and the two straight lines 56 and 57 which represent the different values $m_1$ and $m_2$ of the installed braking force distribution to which the brake installation 10 according to FIG. 1 is adjustable.

It is assumed as an explanatory example that the coefficient of friction $\mu$ between the road and the vehicle wheels has the value 0.6, and that the driver actuates the brake installation 10 with a brake pedal force which would lead to a braking Z of more than 0.6 if the coefficient of friction were higher.

In the initial phase of this braking, the braking force distribution develops along the section 57' starting from the origin of coordinates (0,0) oo the straight line 57 characteristic of the controlled braking force distribution with the relatively higher rear axle braking force proportion which intersects the parabola 63 of the ideal braking force distribution at the point 68, where the straight line 67 characteristic of the constant braking Z=0.4 also intersects the parabola 63 as also the straight lines 64 and 66 for $\mu_{HA}$ and $\mu_{VA}$ =0. By the further increase in the actuating force, the braking force distribution develops along the straight line 57 from the point 68 into the unstable range, "above" the parabola 63 of the ideal braking force distribution; this means that the rear axle is now overbraked and the ABS reacts on at least one of the rear wheel brakes 14 and/or 16 according to one of the relations (2), (2'), (2") or (2"'). In order to simplify the explanation, it will be assumed that the regulation responds at the left-hand rear wheel brake 14, and that this is the case "at the intersection 68" of the straight line 57 with the parabola 63. This has the result that, whereas the braking Z increases beyond the value 0.4, the rear axle braking force proportion now develops along the section 64' of the straight line 64 for $\mu_{HA}$=0.4 starting from the intersection 68 (Z=0.4) and decreasing flatly according to the graph in FIG. 2, until this line intersects at the intersection 69 the straight line 66 for $\mu_{VA}$=0.6, which rises steeply in the graph of FIG. 2. This intersection 69 represents the particular braking force distribution at which the front wheels reach the limit of their transmission capacity and enter into an increased braking slippage and the regulation now becomes effective also at the front axle. It will again be assumed for simplicity of explanation that this is the case from the intersection 69 of the straight line 64 characteristic of $\mu_{HA}$=0.4 with the straight line 66 characteristic of $\mu_{VA}$=0.6 in FIG. 2. As soon as the regulation becomes effective at the front axle, the control of the regulation phases occurs according to those criteria which were explained above for an ABS regulation cycle at one of the front wheel brakes, i.e., inter alia as a function of the markedly higher slippage thresholds $\lambda_1$ and $\lambda_2$, the typical values of which are approximately 8% and 20%, respectively.

Beginning with the response of the regulation at the front axle, the braking force distribution now develops along the straight line 66 characteristics of $\mu_{VA}$=0.6, until this line intersects the parabola 63 of the ideal braking force distribution at the point 71, where the parabola 63 is also intersected by the straight line 64 characteristic of $\mu_{HA}$=0.6. As soon as the braking force distribution corresponding to this intersection is attained, the regulation in its further course causes this braking force distribution to be maintained within regulation deviations dictated by the dimensioning and design.

The ABS 11 so far explained with reference to FIGS. 1 and 2 ensures a stable braking behavior of the vehicle even if its brake installation 10 is designed in the sense of a fixed determination to an installed braking force distribution with a high rear axle braking force proportion.

As a result thereof, an improved utilization of the rear axle brakes, and therewith also an improvement in the braking action overall, are achieved for brakings in which a moderate actuating force is sufficient to obtain the required braking deceleration.

If the ABS 11 fails, then the changeover valve 62 switches automatically back into its basic position 0, in which the installed braking force distribution represented by the straight line 56 in FIG. 2, which is designed for optimization of driving stability, becomes effective.

What has been explained with reference to FIGS. 1 and 2 regarding the construction and the function of the ABS 11 in combination with a brake installation 10 which can be switched or changed over, in the sense of a fixed determination of the installed braking force distribution in each case, to two different values $m_1$ and $m_2$ of the front axle and rear axle braking for proportions, also applies analogously to the exemplary embodiment illustrated in FIG. 3, which differs from that illustrated in FIG. 1 solely in the design of the rear axle brake circuit II and the configuration of the electrohydraulic changeover device 55' dictated thereby, but which is entirely analogous in function to the exemplary embodiment according to FIG. 1.

Figure 3:
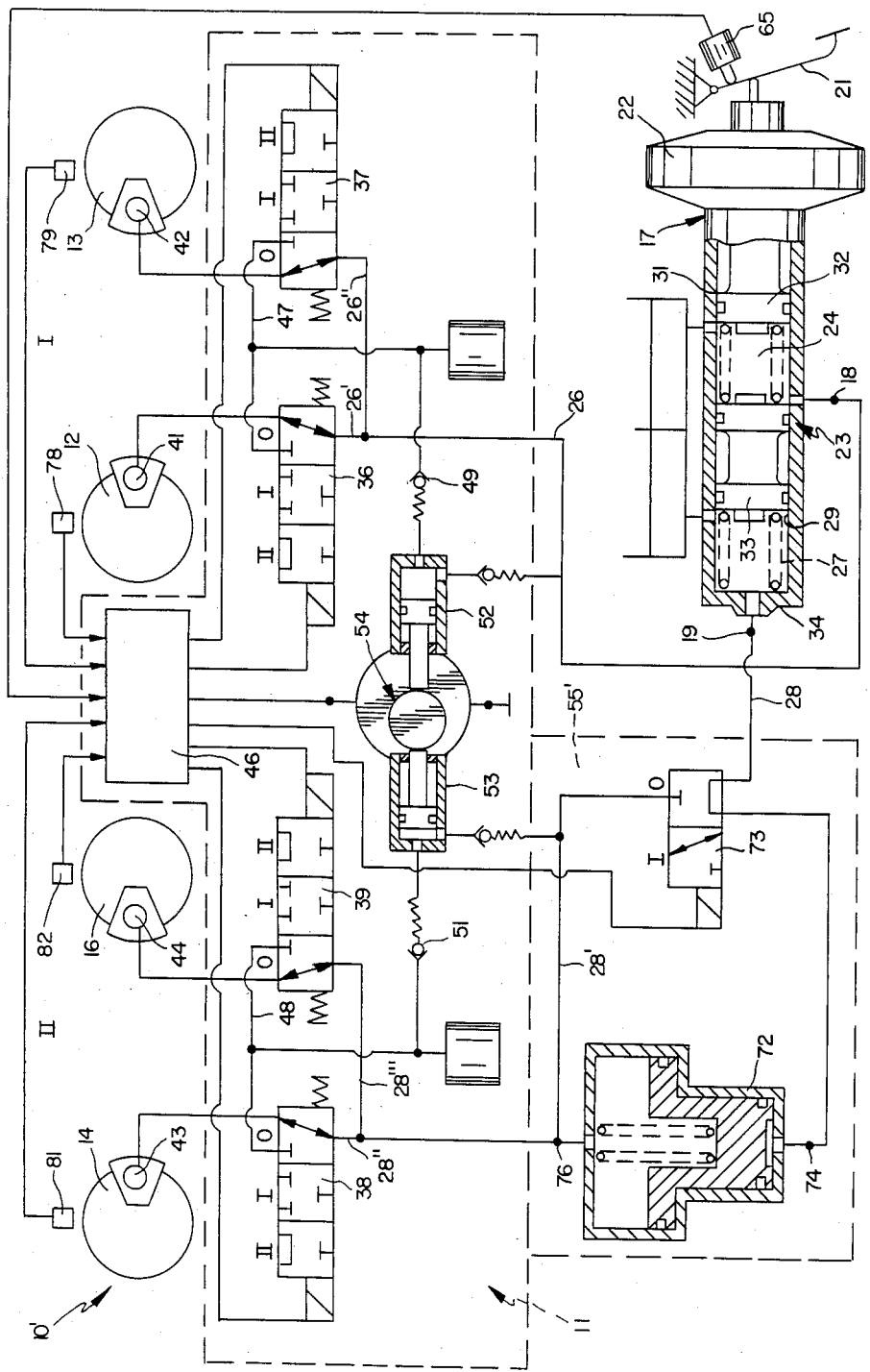
FIG. 3 is a further embodiment of a brake installation equipped with the anti-blockig system according to the invention with rear wheel brakes dimensioned for a high rear axle braking force proportion.

Accordingly, elements of the brake installation 10 and of the ABS 11 having identical or analogous constructions and functions in FIG. 1 and 3 are designated by the same reference numerals, and attention is drawn to the relevant description referring to FIGS. 1 and 2 where this is the case.

In the exemplary embodiment according to FIG. 3, the rear wheel brakes 14 and 16 are dimensioned so that a permanently determined braking force distribution corresponding to the straight line 57 in FIG. 2 is obtained quasi "from the outset."

The electrohydraulic changeover device 55' consists here of a pressure reducer 72 of customary construction and a changeover valve 73, constructed as a 3/2-way solenoid valve, which can be changed over by output signals of the electronic control unit 46.

In the illustrated basic position 0 of the changeover valve 73, the high-pressure input 74 of the pressure reducer 72 is connected to the pressure output 19 of the braking device 17 associated with the rear axle brake circuit II of the brake installation 10', which is shut off in this position 0 of the changeover valve 73 from the section 28', branching towards the wheel brakes 14 and 16, of the main brake line 28 of the rear axle brake circuit II.

The low-pressure output 76 of the pressure reducer 72 is permanently connected to this sectionn 28' of the main brake line 28. For a typical dimensioning of the pressure reducer 72, its output pressure delivered at an output 76 and adapted to be coupled into the rear axle brake circuit II, is 50% of the pressure delivered at the pressure output 19 of the braking device 17.

In the energized position I of the changeover valve 73 which is assumed upon modulation by an output signal of the electronic control unit 46 of the ABS 11, the pressure output 19 of the braking device 17, which is associated with the rear axle brake circuit II, is connected to the section 28' of the main brake line 28 of the rear axle brake circuit II branching towards the rear wheel brakes 14 and 16, but is shut off from the high-pressure input 74 of the pressure reducer 72. Therefore, in this position I the output pressure of the braking device 17 is applied unreduced to the section 28' of the main brake line 28 of the rear axle brake circuit II branching towards the wheel brakes 14 and 16. The braking force distribution of the brake installation 10 associated with this energized position I, in which the changeover valve 73 is switched upon the actuation of the brake installation 10', is represented by the steeper straight line 57 in FIG. 2. The "stable" braking force distribution associated with the basic position 0 of the changeover valve 73 is again represented in FIG. 2 by the flatter rising straight line 56. Again in the embodiment according to FIG. 3, in the case of a failure of the ABS the brake installation 10' is therefore automatically switched back to the braking force distribution according to the straight line 56 which ensures adequate braking stability.

A changeover device corresponding functionally to the changeover deice 55' may also be integrated in simple manner into the braking device 17, for example, in that a small-diameter bore step is provided between the section of the master cylinder bore delimiting the primary output pressure chamber 24 of the braking device 17 and the section of the cylinder bore delimiting the secondary output pressure chamber 27 on the housing side, in which bore step a further floating piston is slidably but pressure-tightly guided—between the primary piston 32 and the secondary piston 33—which conjointly with the secondary piston 33 delimits an annular chamber which can be brought into communication with the primary output pressure chamber by means of a changeover valve, while the changeover valve, which must then be provided, in its energized position connects the primary output pressure chamber 24 of the braking device 17 to its annular chamber and, in its basic position, shuts off the primary output pressure chamber from the annular chamber and connects the latter instead to the pressureless reservoir of the brake installation. Such a master brake cylinder with integrated presure reducer is described in detail in DE-PS No. 25 04 699 (to which reference is made in this context).

Reference will now be made to the relevant particulars of FIG. 4 in order to explain a further exemplary embodiment of a brake installation 10" equipped with an ABS 11 according to the invention which is adjustable to different values $m_1$ and $m_2$ of a permanently determined installed lines 56 and 57 of FIG. 2, and in combination with the ABS 11 permits the utilization of high rear axle braking force proportions analogously to the exemplary embodiments according to FIGS. 1 and 3.

Figure 4:
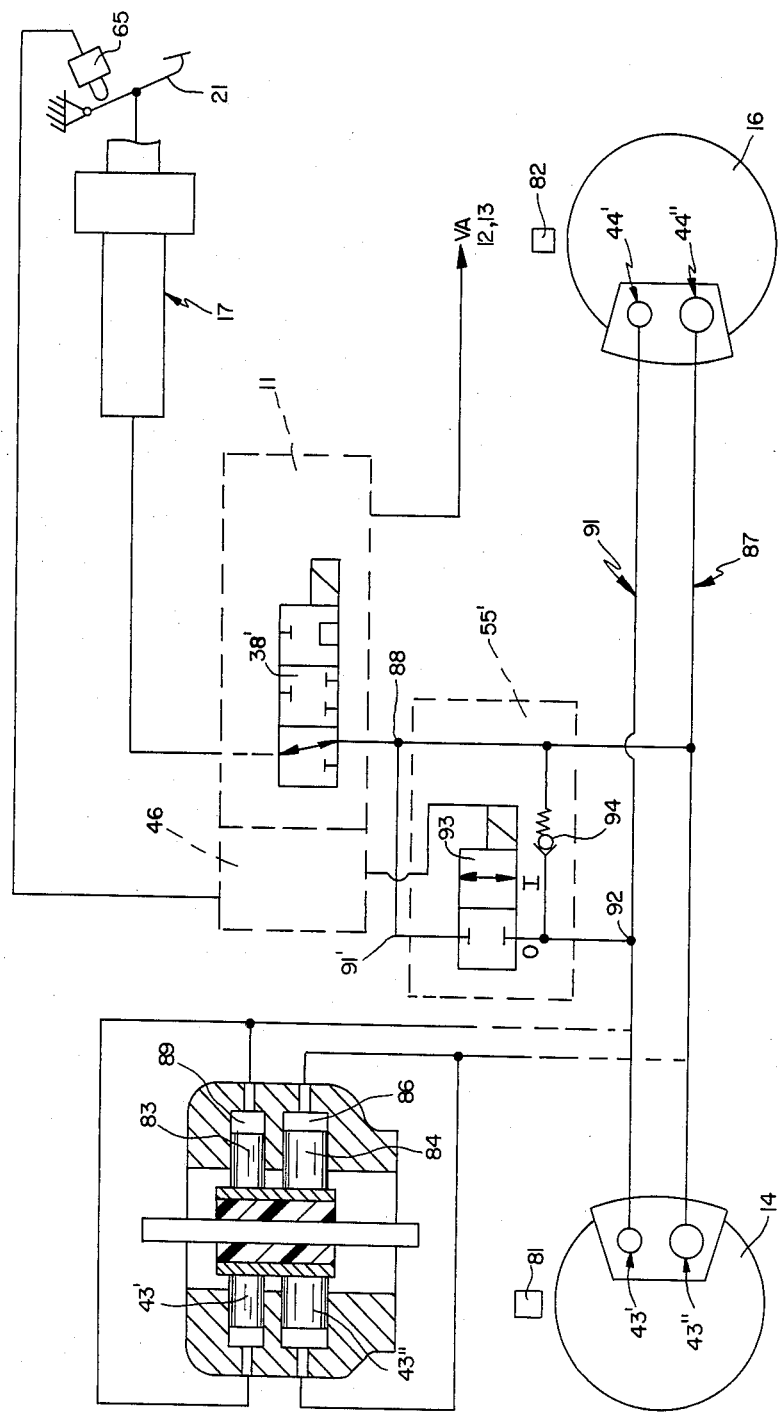
FIG. 4 is a still further embodiment with adjustment of the brake force distribution by utilizing different quantities of the respective effective wheel brake cylinder piston surfaces.

Insofar as the same reference numerals are used in FIG. 4 as in FIGS. 1 and 2, reference is intended to the parts of the description relevant thereto.

For simplicity in the drawing, only the rear axle brake circuit II is shown. The front axle brake circuit I and those elements of the ABS influencing the latter may be realized in the same manner as illustrated in FIG. 1 and 3.

It will also be assumed for the purpose of this specific exemplary embodiment that the ABS 11 operates on the rear axle brake circuit II according to the so-called Select Low Principle, according to which the regulation operates "in the same phase" on the rear wheel brakes 14 and 16, that is to say, it intervenes in the braking force regulation of both rear wheel brakes 14 and 16 in the same manner, even if a tendency to lock occurs only at one of the two rear wheel of the vehicle, but otherwise the regulation occurs according to the same criteria as explained in detail with reference to the exemplary embodiment according to FIG. 1. Only a single braking pressure regulator valve 38', corresponding in construction and function to the braking pressure regulator valves 36 to 39, is then required for the braking pressure regulation for the rear axle brake circuit II, as indicated diagrammatically in FIG. 4.

Analogously to the exemplary embodiment according to FIG. 3, the rear wheel brakes 14 and 16 are also constructed in this embodiment so that when their wheel brake cylinders are acted upon by the same braking pressure as the wheel brake cylinders of the front wheels, that braking force distribution results which is associated with a relatively higher rear axle braking force proportion according to the straight line 57 of FIG. 2. The changeover to the braking force distribution with the relatively smaller rear axle braking force proportion represented by the straight line 56 in FIG. 2 takes place here by a reduction of the effective piston surfaces of the wheel brake cylinders provided to generate the braking force in the context of the rear wheel brakes 14 and 16.

For this purpose the rear wheel brakes 14 and 16 are constructed as four-cylinder disc brakes which, instead of only one pair of wheel brake cylinders 43 or 44, as shown for the brake installations 10 and 10', each include two pairs 43' and 43", 44' and 44", the pistons 83 and 84 of which have different cross-sectional areas $F_1$ and $F_2$, as may be gathered from the cross-sectional view of the left-hand rear wheel brake 14 shown additionally on a larger scale in FIG. 4.

The pressure chambers 86 of the wheel brake cylinders pairs 43" and 44" having the larger piston 84 are connected permanently by a first T-brake line, generally designated by 87, to the pressure output 88 of the ABS 11 associated with rear axle brake circuit II.

The pressure chambers 89 of the wheel brake cylinder pairs 43' and 44' with the smaller pistons 83 are likewise connected by a second T-brake line generally designated by 91 to the pressure output 88 of the ABS 11 associated with the rear axle brake circuit II. The connecting section 91 of the second T-brake line 91 leading from the rear axle braking pressure output 88 of the ABS 11 to the branch point 92 of the line 91 can be shut off and opened by means of a 2/2-way solenoid valve 93 which forms here the functional element of the electrohydraulic changeover device 55" that can be electrically modulated.

In the illustrated basic position 0 of this solenoid valve 93, the second T-brake line 91 of the rear axle brake circuit II is shut off from the pressure output 88, associated with this circuit, of the ABS 11. In the energized position I of this solenoid valve 93, the wheel brake cylinder pairs 43' and 44' of the rear wheel brakes 14 and 16 are connected to the rear axle braking pressure output 88 of the ABS 11. Upon an actuation of the brake installation 10"—assuming a correct functioning of the ABS 11—the solenoid valve 93 is controlled into its through-flow position I by a control output signal of the electronic control unit 46 of the ABS 11, and the brake installation 10" is thereby activated into its functional condition associated with the relatively higher rear axle braking force proportion, which condition is represented by the straight line 56 in FIG. 2. In the case of a malfunction of the ABS 11, the modulating signal for the solenoid valve 93 disappears, whereby the latter drops back into its shut-off position 0 and the brake installation 10" is changed over into the functional condition represented by the straight line 56 in FIG. 2, which then still provides the best possible braking stability.

The rear axle brake circuit II of the brake installation 10" according to FIG. 4 comprises therefore, as it were, two T-partial braking circuits, one of which is "switchable on and off" in order to modify the installed braking force distribution.

In the exemplary embodiment according to FIG. 4, the preselection of the critical value $Z_{crit}$ of the vehicle deceleration Z referred to the vehicle weight, for which the straight line 57 in FIG. 2 corresponding to the "unstable" braking force distribution intersects the parabola 63 of the ideal braking force distribution, occurs by the unsuitable choice in this context of the ratio of surfaces $F_1/F_2$ of the cross-sectional surfaces $F_1$ and $F_2$ of the pistons 83 and/or 84 of the wheel brake cylinder pairs 43' and 44' or 43" and 44" of the rear wheel brakes 14 and 16.

A check valve 94, which is connected between the branch point 92 of the second T-brake line 91 of the rear axle brake circuit II and the first T-brake line 87 of the rear axle brake circuit II, is acted upon in the opening direction by a relatively higher pressure in the second T-brake line 91 than in the first T-brake line 87, and in the closing direction by higher pressure in the first T-brake line than in the second. This check valve 94, the "closing force" of which is equivalent to a low pressure of approximately 4 bar, prevents the possibility of an excessive pressure being built up in the second T-brake line 91, for example, by a temperature rise, when the brake installation 10" is non-actuated.

The mode of regulation by the Select Low Principle at the rear axle which is provided for the ABS 11 of the brake installation 10" of FIG. 2, which produces particularly good driving stability and braking stability, may, of coure, also be utilized in the exemplary embodiments according to FIGS. 1 and 3, in that their braking pressure regulator valves 38 and 39 of the rear wheel brakes 14 and 16 are respectively modulated by the same control output signal of the electronic control unit 46.

When the anti-blocking regulation at the rear axle 14, 16 operates according to the Select Low Principle, a single wheel speed sensor, which, for example, detects the speed of the articulated shaft by means of which the rear wheels of the vehicle are driven through a differential gear, is sufficient to detect a locking tendency occurring "anywhere" at the rear axle 14, 16.

In the case of such a construction of the ABS 11, limitations as to the practicable regulation criteria must, of course, be accepted, because it is no longer possible, for example, to perform a comparison of the wheel speeds of the vehicle wheels on one side of the vehicle.

It is therefore expedient in order to avoid such a restriction in the sense of good sensitivity of the regulation, if the movement behavior of the rear wheels of the vehicle can be detected individually, by means of a wheel speed sensor 81 and 82 each, even when the regulation on the rear axle operates according to the Select Low Principle.

An explanation is given below, once more with reference to FIG. 2, of certain technical regulation details, the realization of which leads to particularly good sensitivity of the regulation in all the embodiments described:

As long as the ABS 11 is required to respond, or has responded, solely at the rear axle 14, 16 in the sense explained above, it is advantageous for the purpose of achieving an improved response sensitivity of the ABS 11, if the commencement of the anti-blocking regulation is controlled not only as a function of exceeding a differential value $\Delta\lambda$ of the braking slippage between the rear wheels and the front wheels, but also as a function of exceeding a deceleration threshold $a_H$ of the wheel decelerations at the rear wheels, that is to say, to reduce the braking pressure at the rear wheel subjected to the regulation when its wheel deceleration exceeds the mentioned value $a_H$. A suitable value of the deceleration threshold $a_H$ in this sense is the critical value $Z_{crit}$ of the vehicle deceleration for the "unstable" braking force distribution which is effective at the commencement of a braking and is represented by the straight line 57 in FIG. 2, hence the value $a_H=0.4$ according to the illustration in FIG. 2. Depending on whether the vehicle is braked sharply or gently, either the deceleration threshold value $a_H$ or the limit value $\Delta\lambda$ of the slippage differential will be exceeded sooner and therewith the commencement of the regulation at the rear axle will thus be obtained correct as regards the existing situation in order to hold the vehicle in the stable dynamic range "beneath" the straight line 63 of the ideal braking force distribution, until the regulation finally also becomes effective at the front axle. It is clear that the deceleration threshold $a_H$ may also be slightly smaller than the value of the critical vehicle deceleration for the unstable braking force distribution, marked by the point 68 in FIG. 2.

The regulation as a function of the low limit values of deceleration $a_H$ and slippage differential $\Delta\lambda$, as long as the regulation is only effective at the rear axle 14, 16, causes the vehicle to remain with certainty in a stable dynamic braking range, whereas the braking force distribution develops along the section 64' of the straight line $\mu_H=0.4=a_H$ up to the point 69 in FIG. 2, whereby when reaching the same, the anti-blocking regulation also responds at the front axle.

With the commencement of the regulation at the front axle 12, 13, a changeover occurs in response thereof as a function of a threshold $a_S$ of the value of the wheel decelerations which with a typical value of 1.4 is clearly greater than the maximum attainable vehicle deceleration, and also to the response after a threshold $\lambda_2$ of the relative slippage, which at approximately 20% is in turn somewhat greater than the braking slippage $\lambda_{Fmas}$ which is associated with maximum braking force transmission between the wheels and the road. The changeover of the regulation to these threshold values $a_S$ and $\lambda_2$ then caues the braking force distribution to be adjusted at least approximately to the ideal value attainable under the existing road conditions.

While we have shown and described several embodiments in accordance with the present invention, it is understood that the same is not limited thereto but is susceptible of numerous changes and modifications as known to those skilled in the art, and we therefore do not wish to be limited to the details shown and described herein but intend to cover all such changes and modifications as are encompassed by the scope of the appended claims.

We claim:

1. An anti-blocking system for a road vehicle having a hydraulic multi-circuit brake installation operable to be changed over by an electrohydraulic changeover means from a functional condition which corresponds, in the sense of a fixed determination of the front axle/-rear axle braking force distribution, to a dimensioning for a stable driving behavior up to the highest possible values of the braking of the vehicle, into a functional condition which corresponds, also in the sense of a fixed determination of said ratio, to a dimensioning of the latter for a higher proportion of the rear axle braking force, whereby the anti-blocking system operates according to the principle of keeping the braking slippage of the vehicle wheels within a range of values compatible both with good braking deceleration and with adequate driving stability, comprising brake pressure regulating valve means for the control of brake pressure build-up phases, brake pressure maintaining phases and brake pressure reduction phases, the brake pressure regulating valve means being operable to be activated into coresponding functional positions by output signals of an electronic control means which generates the signals necessary for the control of the different regulation phases in correct sequence and combination for the regulation from a comparative and differentiating processing of wheel velocity sensor output signals characteristic of the movement behavior of the vehicle wheels, the changeover means being operable at the commencement of a braking to control the brake installation into that functional condition which coresponds to the braking force distribution with the higher rear axle braking force proportion in such a manner that as long as the regulation is effective only in the rear axle braking circuit, the anti-blocking system operates on the principle of keeping the braking slippage $\lambda_H$ occurring at the rear axle in relation to the braking slippage $\lambda_V$ occurring at the front axle within a range of values given by the relation $$\lambda_V < \lambda_H < \lambda_V + \Delta\lambda,$$

wherein $\Delta\lambda$ is a prescribed limit of the slippage difference by which the rear axle braking slippage $\lambda_H$ may exceed the braking slippage $\lambda_V$ in the front axle braking circuit, while the value $\Delta\lambda$ is between about 2% and 6%, and that upon the commencement of the anti-blocking regulations at least at one of the front wheels of the vehicle the ABS is changed over to that functional condition, in which it operates on the principle of keeping the respective relative braking slippage $\lambda_R$ referred to a reference velocity $v_F$ assumed as representative of the vehicle speed, which is defined by the relation $$\lambda_R = \frac{(v_F - v_R)}{v_F} \cdot 100(\%),$$

wherein $v_R$ is the wheel velocity of the vehicle wheel subjected to the regulation, both at the front axle and at the rear axle, within a range of values delimited by a slippage threshold $\lambda_2$ which is at most greater by about 2% to 4% than the braking slippage associated with the maximum tangential force transmission capacity of the vehicle wheels.

2. An anti-blocking system acording to claim 1, wherein the slippage difference limitation $\Delta\lambda$ has a value of $4\pm0.5\%$.

3. An anti-blocking system according to claim 2, wherein the anti-blocking regulation, as long as it is effective only at the rear axle, operates on the principle of keeping the braking slippage $\lambda_H$ occurring at the rear axle within the range of values given by the relation $$\lambda_V + \Delta\lambda' \leq \lambda_H \leq \lambda_V + \Delta\lambda,$$

whereby the relation $\Delta\lambda' \approx \Delta\lambda/2$ is adequate.

4. An anti-blocking system according to claim 1, wherein the brake installation is constructed as a dual-circuit brake installation having a rear axle brake circuit and a front axle brake circuit and is dimensioned so that a parabola of the ideal braking force distribution chacteristic of the vehicle under normal load is intersected by a straight line of the installed braking force distribution characteristic of the braking force distribution with the higher rear axle braking force proportion at a point corresponding to a braking between 0.3 and 0.5, and wherein the changeover means includes a pressure reducer means whose low-pressure output is connected to a main brake line of the rear axle braking circuit and whose high-pressure input is connected by way of a solenoid valve to a pressure output associated with the rear axle braking circuit of a braking means provided to actuate the brake installation, the basic position of the solenoid valve being a first through-flow position, in which the rear axle pressure output of the braking means is connected to the pressure reducer input and is shut off from the wheel brakes and which, upon the commencement of braking, is activated, controlled by a control signal of the electronic control means triggered by a brake light switch, into its energized position, in which the rear axle brake pressure output of the braking means is connected directly to the main brake line of the rear axle braking circuit.

5. A system according to claim 4, wherein said point corresponds to a braking of about 0.4.

6. An anti-blocking system according to claim 1, wherein the brake installation is constructed as a dual-circuit brake installation having a rear axle brake circuit and a front axle brake circuit and is dimensioned so that a parabola of the ideal braking force distribution characteristic of the vehicle under normal load is intersected by a straight line of the permanently determined installed braking force distribution characteristic of the braking force distribution with the lower rear axle braking force proportion at a point corresponding to a braking of about 1.0, and wherein the changeover means includes a pressure intensifier means whose high pressure output is connected to a main brake line of the rear axle brake circuit and whose low-pressure input to the pressure output, associated with the rear axle brake circuit, of a braking means provided to actuate the brake installation, by way of a solenoid valve, the basic position of which is a through-flow position in which the rear axle braking pressure output of the braking means is connected to the main brake line of the rear axle brake circuit and is shut off from the low-pressure input of the pressure intensifier means, and which, upon the commencement of a braking, is operable to be activated, controlled by an output signal of the electronic control means triggered by a brake light switch, into its energized position in which the rear axle braking pressure output of the braking means is connected to the low-pressure input of the pressure intensifier means.

7. An anti-blocking system according to claim 4, wherein the pressure reducer means is integrated into the braking means.

8. An anti-blocking system according to claim 7, wherein the braking means is constructed as a tandem master cylinder, whose primary output pressure chamber is associated with the front axle brake circuit and whose secondary output pressure chamber with the rear axle brake circuit, and wherein a smaller-diameter bore step which is provided between the section of the bore of its cylinder housing delimiting the primary output pressure chamber and the section of the cylinder bore delimiting the secondary output pressure chamber, contains a floating piston slidably and pressure-tightly guided which delimits conjointly with the secondary piston an annular chamber that can be brought into communication with primary output pressure chamber by a changeover valve which, in its energized position, connects the primary output pressure chamber of the braking means to said annular chamber and in its basic position shuts off the primary output pressure chamber from the annular chamber and connects the latter instead to a pressureless reservoir of the brake installation.

9. An anti-blocking system according to claim 1, wherein, as long as the regulation is not activated at the front axle, the wheel circumferential velocity of the front wheel of the respective side of the vehicle is utilized as a reference velocity for the determination by the electronic control means of the braking slippage of the rear wheels of the respective side of the vehicle.

10. An anti-blocking system according to claim 1, wherein as long as the regulation is not activated at the front axle, the sum of the wheel circumferential velocities of the front wheels is taken as a reference velocity for the determination by the electronic control means of the braking slippage of the rear wheels and the regulation responds when the sum of the circumferential velocities of the rear wheels is smaller by about 3 to 6%, than the sum of the circumferential velocities of the front wheels.

11. A system according to claim 10, wherein said sum of velocities of the rear wheels is smaller by about 4% than the sum of velocities of the front wheels.

12. An anti-blocking system according to claim 1, wherein, as long as the regulation is effective only at the rear axle, the circumferential velocity of the front wheel diagonally opposite the respective rear wheel is utilized as a reference velocity for the determination by the electronic control means of the braking slippage of the right-hand or left-hand rear wheel, respectively.

13. An anti-blocking system according to claim 1, wherein the rear axle brake circuit of the brake installation comprises two T-brake circuits, one of which is permanently connected to a pressure output of the ABS associated with the rear axle brake circuit, whereas the other can be shut off from the rear axle braking pressure output of the ABS by a 2/2-way solenoid valve means of the changeover means, and wherein when the brake installation is actuated by an output signal of the electronic control means, said solenoid valve means is activated into its energized position in which the disconnectable T-brake circuit is connected to the rear axle brake pressure output.

14. An anti-blocking system according to claim 1, wherein, as long as the ABS is effective only at the rear axle, it responds when the wheel deceleration exceeds quantitatively a threshold value which is lower than the critical braking for which a straight line of the installed braking force distribution intersects a parabola of the ideal braking force distribution, and wherein upon response of the regulation at the front axle, the deceleration and slippage reaction thresholds of the wheel decelerations and of the braking slippage, respectively, are also increased at the rear axle to values which exceed the maximum attainable vehicle deceleration of the brake installation and/or a value of the braking slippage characteristic of the maximum utilization of friction.

* * * * *